United States Patent [19]

Tashima et al.

[11] Patent Number: 5,005,359
[45] Date of Patent: Apr. 9, 1991

[54] AIR SUPPLY CONTROL SYSTEMS FOR TURBOCHARGED INTERNAL COMBUSTION ENGINES

[75] Inventors: Seiji Tashima; Haruo Okimoto; Toshimichi Akagi; Yasushi Niwa, all of Hiroshima, Japan

[73] Assignee: Mazda Motor Corporation, Hiroshima, Japan

[21] Appl. No.: 324,670

[22] Filed: Mar. 17, 1989

[30] Foreign Application Priority Data

Mar. 19, 1988 [JP] Japan .................................. 63-66790
Jan. 20, 1989 [JP] Japan .................................. 1-12677

[51] Int. Cl.$^5$ ............................................ F02B 37/12
[52] U.S. Cl. .......................................... 60/600; 60/612
[58] Field of Search ................... 60/600, 601, 609, 612

[56] References Cited

U.S. PATENT DOCUMENTS

| 2,380,777 | 7/1945 | Moss | 60/612 X |
| 4,709,552 | 12/1987 | Rutschmann et al. | 60/600 |
| 4,793,140 | 12/1988 | Esch | 60/612 X |

FOREIGN PATENT DOCUMENTS

| 41417 | 4/1981 | Japan . |
| 12177 | 3/1982 | Japan . |
| 160022 | 9/1984 | Japan . |
| 178329 | 11/1985 | Japan . |
| 259722 | 12/1985 | Japan . |
| 38124 | 2/1986 | Japan . |
| 275531 | 12/1986 | Japan . |

Primary Examiner—Michael Koczo
Attorney, Agent, or Firm—Sixbey, Friedman, Leedom & Ferguson

[57] ABSTRACT

An air supply control system for an internal combustion engine comprises a plurality of superchargers including a turbosupercharger, an exhaust cutoff valve operative selectively to open and close an exhaust passage in which a turbine of the turbosupercharger is disposed, an intake air cutoff valve operative selectively to open and close an intake passage in which a blower of the turbosupercharger is disposed, an intake air relief valve operative selectively to open and close a relief passage provided for detouring the blower of the turbosupercharger, an engine operation detector for detecting operating conditions of the engine, a cutoff valve controller operative, in response to the detection output from the engine operation detector, to cause both the exhaust cutoff valve and the intake air cutoff valve to be closed when intake air mass flow fed to the engine is to be relatively small and to cause both the exhaust cutoff valve and the intake air cutoff valve to be open when the intake air mass flow fed to the engine is to be relatively large, and a relief valve controller operative, in response to the detection output from the engine operation detector, to cause the intake air relief valve to be closed at a time point earlier than another time point at which the exhaust cutoff valve is fully opened.

15 Claims, 9 Drawing Sheets

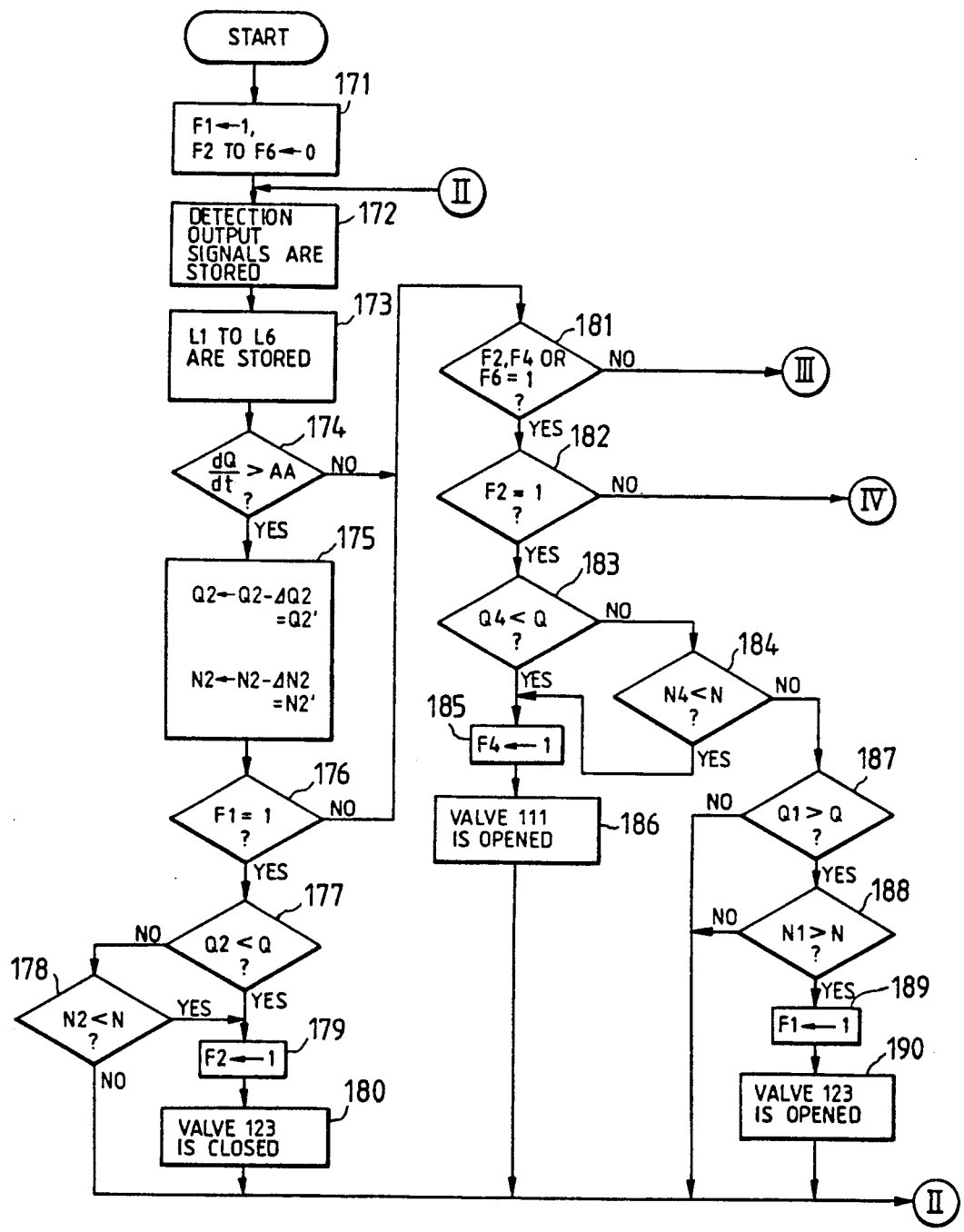
FIG. 9-a

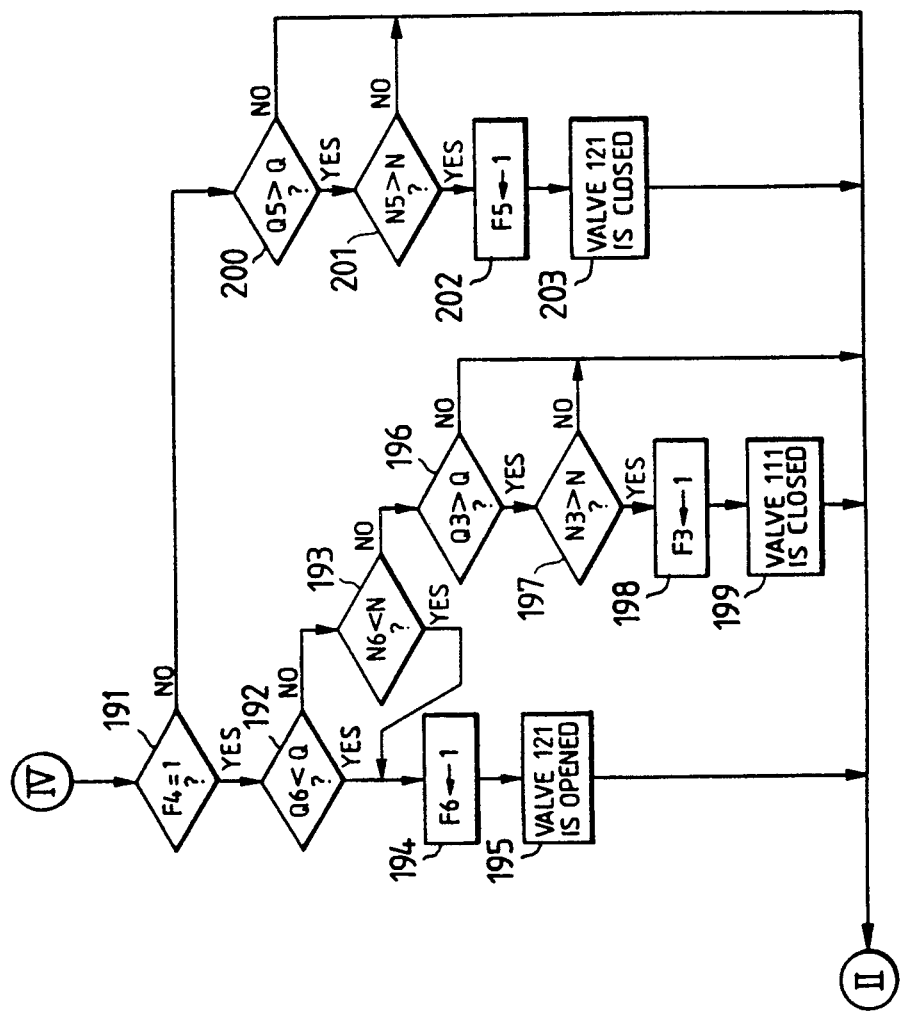

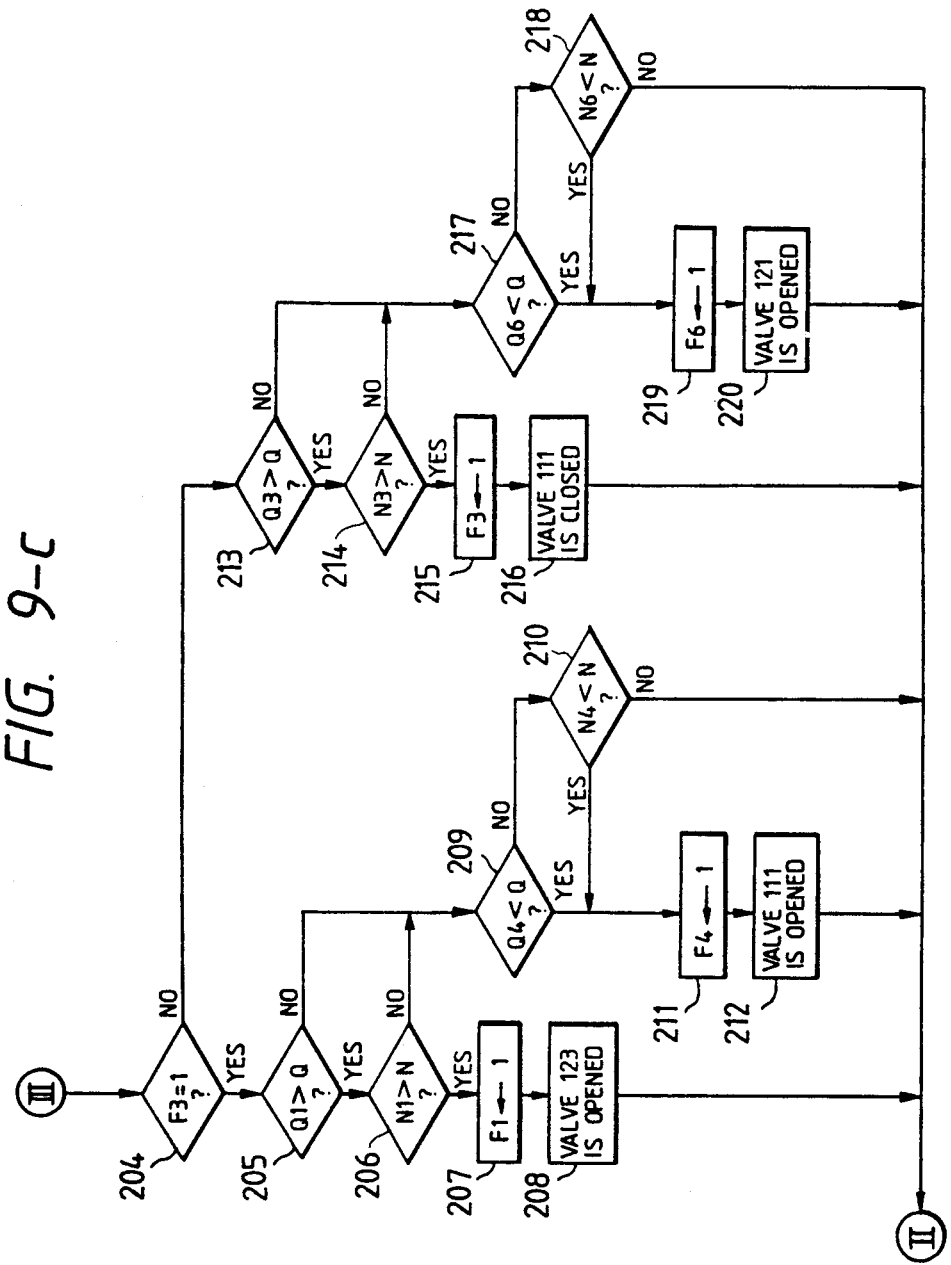

AIR SUPPLY CONTROL SYSTEMS FOR TURBOCHARGED INTERNAL COMBUSTION ENGINES

BACKGROUND OF THE INVENTION

1. Field of the Invention

The present invention relates generally to air supply control systems for internal combustion engines, and more particularly to a system for controlling air supply effected to an internal combustion engine by a plurality of superchargers accompanying with the internal combustion engine.

2. Description of the Prior Art

In the field of internal combustion engines used in vehicles, there has been proposed a so-called sequentially controlled supercharging system in which a couple of primary and secondary turbosuperchargers are employed in an internal combustion engine and so controlled that only the primary turbosupercharger works for supercharging the engine when intake air mass flow in an intake passage of the engine is relatively small and both the primary and the secondary turbosuperchargers work simultaneously for supercharging the engine when the intake air mass flow is relatively large, as disclosed in, for example, the Japanese utility model application published after examination under publication number 57-12177 and the Japanese patent application published before examination under publication number 60-259722. In such a system, an exhaust cutoff valve is disposed in a portion of an exhaust passage of the engine through which exhaust gas is applied to a turbine of the secondary turbosupercharger and an intake air cutoff valve is also disposed in a portion of the intake passage of the engine through which air compressed by a blower of the secondary turbosupercharger is supplied to a combustion chamber of the engine, and each of the exhaust cutoff valve and the intake cutoff valve is controlled to be close and open so as to cause the primary and secondary turbosuperchargers to operate in the aforementioned manner.

In connection with the control in operation of the primary and secondary turbosuperchargers, it has been proposed to put the secondary turbosupercharger in a condition of preliminary rotation before the secondary turbosupercharger commences to work for supercharging the engine for the purpose of suppressing torque shock arising on the engine due to time lag in the starting characteristic of the secondary turbosupercharger. In such a case, it has been usual that the preliminary rotation of the secondary turbosupercharger is caused by such a control as to open the exhaust cutoff valve for supplying the turbine of the secondary turbosupercharger with the exhaust gas under a condition in which a intake air relief valve which is provided in a bypass provided to the intake passage for detouring the secondary turbosupercharger is opened.

However, the preliminary rotation of the secondary turbosupercharger thus caused in the manner proposed previously brings about a disadvantage that the primary turbosupercharger is undesirably reduced in its speed of rotation because the exhaust gas branches through the exhaust cutoff valve which is opened under the condition in which the intake air relief valve is opened and thereby the exhaust gas supplied to a turbine of the primary turbosupercharger is reduced and this compels the preliminary rotation of the secondary turbosupercharger to be conducted insufficiently for a relatively short period of time just before the secondary turbosupercharger commences to work for supercharging the engine. Accordingly, in the case where the preliminary rotation of the secondary turbosupercharger is conducted in the manner proposed previously, it is difficult to put the secondary turbosupercharger in a condition of sufficiently high preliminary rotation before the secondary turbosupercharger commences to work for supercharging the engine, and therefore the torque shock arising on the engine is not sufficiently reduced when the secondary turbosupercharger commences to work for supercharging the engine.

OBJECTS AND SUMMARY OF THE INVENTION

Accordingly, it is an object of the present invention to provide an air supply control system for an internal combustion engine provided with a plurality of superchargers including a turbosupercharger operative to work when intake air mass flow fed to the engine is to be relatively large, which avoids the foregoing disadvantage and problem encountered with the prior art.

Another object of the invention is to provide an air supply control system for an internal combustion engine provided with a plurality of superchargers including a turbosupercharger operative to work when intake air mass flow fed to the engine is to be relatively large, by which the turbosupercharger can be put in a condition of sufficiently high preliminary rotation before it commences to work for supercharging the engine, so that torque shock arising on the engine is surely suppressed when the secondary turbosupercharger commences to work for supercharging the engine.

According to the present invention, there is provided an air supply control system for an internal combustion engine comprising a plurality of superchargers including at least a first supercharger and a second supercharger which is constituted as a turbosupercharger having a turbine disposed in one of separated exhaust passages connected with the engine and a blower connected through a shaft with the turbine and disposed in one of separated intake passages connected with the engine, an exhaust cutoff valve operative selectively to be open and closed respectively for opening and closing the separated exhaust passage in which the turbine of the second supercharger is disposed, an intake air cutoff valve operative selectively to be open and closed respectively for opening and closing the separated intake passage in which the blower of the second supercharger is disposed, an intake air relief valve operative selectively to be open and closed respectively for opening and closing a relief passage which is provided to the separated intake passage in which the blower of the second supercharger is disposed for detouring the blower of the second supercharger, an engine operation detector for detecting operating conditions of the engine to produce a detection output, a cutoff valve controller operative, in response to the detection output from the engine operation detector, to cause both the exhaust cutoff valve and the intake air cutoff valve to be closed so that the first supercharger works for supercharging the engine but the second supercharger is restrained from supercharging the engine when intake air mass flow fed to the engine is to be relatively small and to cause both the exhaust cutoff valve and the intake air cutoff valve to be open so that both of the first and second superchargers work simultaneously for supercharging the engine when the intake air mass flow fed to the engine is to be relatively large, and a relief valve controller operative, in response to the detection output from the engine operation detector, to cause the intake air relief valve to be closed at a time point not later than another time point at which the exhaust cutoff valve is fully opened.

In the air supply control system thus constituted in accordance with the present invention, when the detection output from the engine operation detector represents that the intake air mass flow fed to the engine is to be relatively large, both of the exhaust cutoff valve and the intake air cutoff valve are opened by the cutoff valve controller, so that the second supercharger, which is the turbosupercharger, works for supercharging the engine in addition to the first supercharger. On such an occasion, before the exhaust cutoff valve is opened, a relatively small exhaust gas flow which passes through, for example, an exhaust bypass passage bypassing the exhaust cutoff valve is supplied to the turbine of the second supercharger under a condition in which the intake air relief valve is opened and thereby the second supercharger is subjected to its preliminary rotation before it commences to work for supercharging the engine. The preliminary rotation of the second supercharger continues until the intake air relief valve is closed by the relief valve controller on or before the time point at which the exhaust cutoff valve is opened. Accordingly, the second supercharger is put in a condition of sufficiently high preliminary rotation caused by the relatively small exhaust gas flow just before the exhaust cutoff valve is opened. When the exhaust cutoff valve is opened, the intake air cutoff valve is also opened and the second supercharger under the sufficiently high preliminary rotation commences to work for supercharging the engine under a condition in which the intake air relief valve is closed.

Accordingly, the torque shock arising on the engine is surely suppressed when the second supercharger commences to work for supercharging the engine. Further, since the intake air relief valve is closed on or before the time point at which the exhaust cutoff valve is opened, the speed of rotation of the second supercharger is smoothly increased during a period of time between the time point at which the exhaust cutoff valve is opened and a time point at which the intake air cutoff valve is opened.

In an embodiment, the cutoff valve controller and the relief valve controller are operative to detect, based on the detection output from the engine operation detector, one of predetermined operating areas provided on an operating characteristic chart of the engine in which an actual operating condition of the engine resides and to control respectively the exhaust and intake air cutoff valves and the intake air cutoff valve in accordance with the detected operating area.

Further, in an embodiment, when the detection output from the engine operation detector represents that the engine is rather rapidly accelerated, the relief valve controller is operative to advance the time point at which the intake air relief valve is closed after the preliminary rotation of the second supercharger has started but before the exhaust cutoff valve is opened, so that the speed of the preliminary rotation of the second supercharger is quickly increased.

The above, and other objects, features and advantages of the present invention will become apparent from the following detailed description which is to be read in conjunction with the accompanying drawings.

BRIEF DESCRIPTION OF THE DRAWINGS

FIGS. 9-a, 9-b and 9-c show a flow chart used for explaining the operation of the embodiment shown in FIG. 6.

DESCRIPTION OF THE PREFERRED EMBODIMENTS

Figure 1:
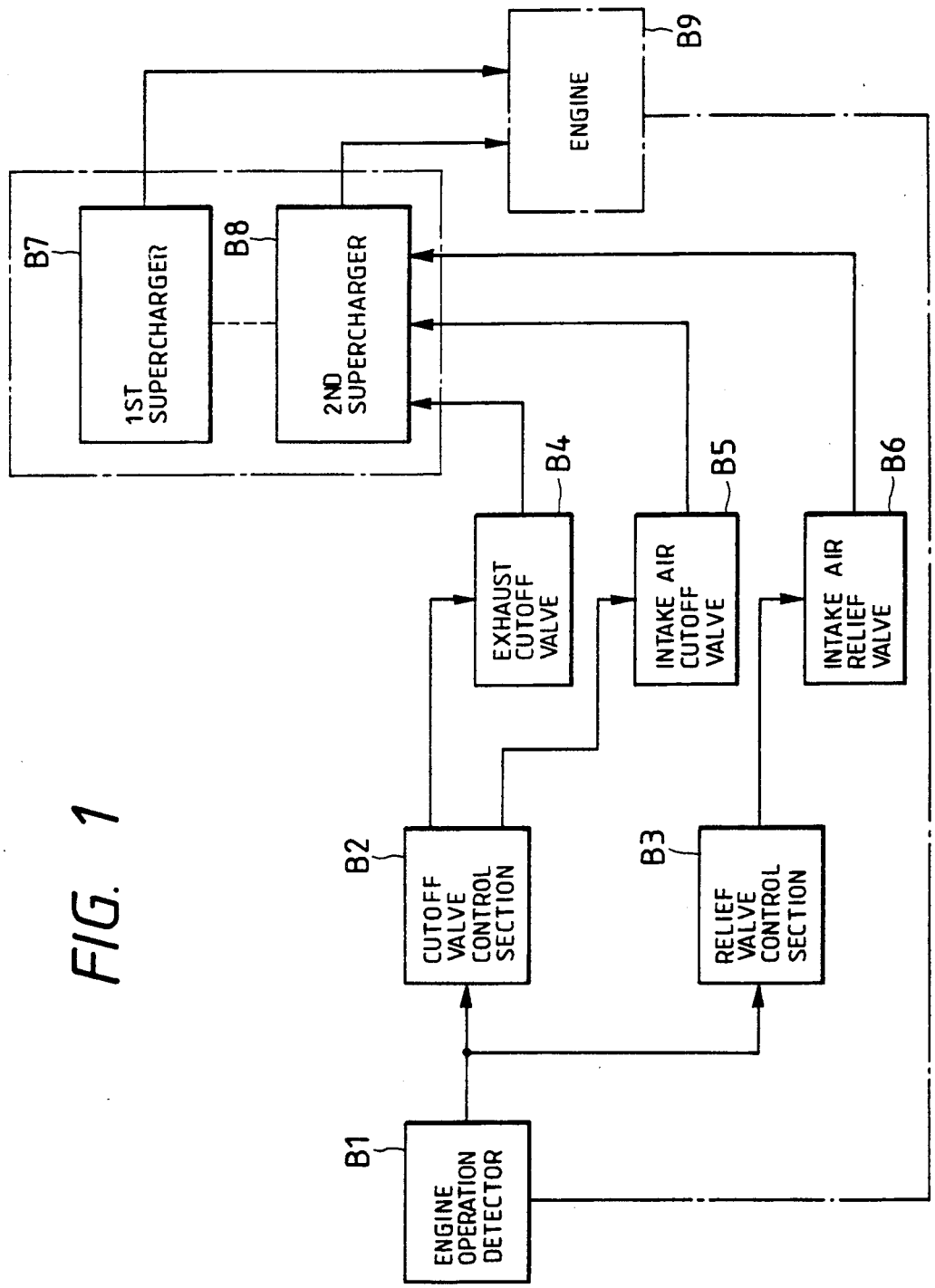
FIG. 1 is a block diagram illustrating the basic arrangement of an air supply control system for an internal combustion engine according to the present invention.

FIG. 1 illustrates a functional block diagram of a system incorporating the present invention. In the functional block diagram of FIG. 1, the system comprises an engine operation detector B1, a cutoff valve control section B2, a relief valve control section B3, an exhaust cutoff valve B4, an intake air cutoff valve B5, an intake air relief valve B6, and superchargers including a first supercharger B7 and a second supercharger B8, and the superchargers are connected with an engine B9 to which the system is applied.

The second supercharger B8 is constituted as a turbosupercharger having a turbine disposed in one of separated exhaust passages of the engine B9 and a blower connected with the turbine and disposed in one of separated intake passages of the engine B9. The exhaust cutoff valve B4 is operative selectively to be open and closed respectively for opening and closing the separated exhaust passage in which the turbine of the second supercharger B8 is disposed, the intake air cutoff valve B5 is operative selectively to be open and closed respectively for opening and closing the intake passage in which the blower of the second supercharger B8 is disposed, and the intake air relief valve B6 is operative selectively to be open and closed respectively for opening and closing a relief passage which is provided to the separated intake passages in which the blower of the second supercharger B8 is disposed for detouring the blower of the second supercharger B8.

The engine operation detector B1 detects operating conditions of the engine B9 and produces a detection output, and the cutoff valve control section B2 is operative to cause both the exhaust cutoff valve B4 and the intake air cutoff valve B5 to be closed so that the first supercharger B7 works for supercharging the engine B9 but the second supercharger B8 is restrained from supercharging the engine B9 when the detection output from the engine operation detector B1 indicates that intake air mass flow fed to the engine B9 is to be relatively small, and to cause both the exhaust cutoff valve B4 and the intake air cutoff valve B5 to be open so that both of the first supercharger B7 and the second supercharger B8 work for supercharging the engine B9 when the detection output from the engine operation detector B1 indicates that the intake air mass flow fed to the engine B9 is to be relatively large. The relief valve control section B3 is operative, in response to the detection output from the engine operation detector B1, to cause the intake air relief valve B6 to be closed at a time point not later than another time point at which the exhaust cutoff valve B4 is opened.

Figure 2:
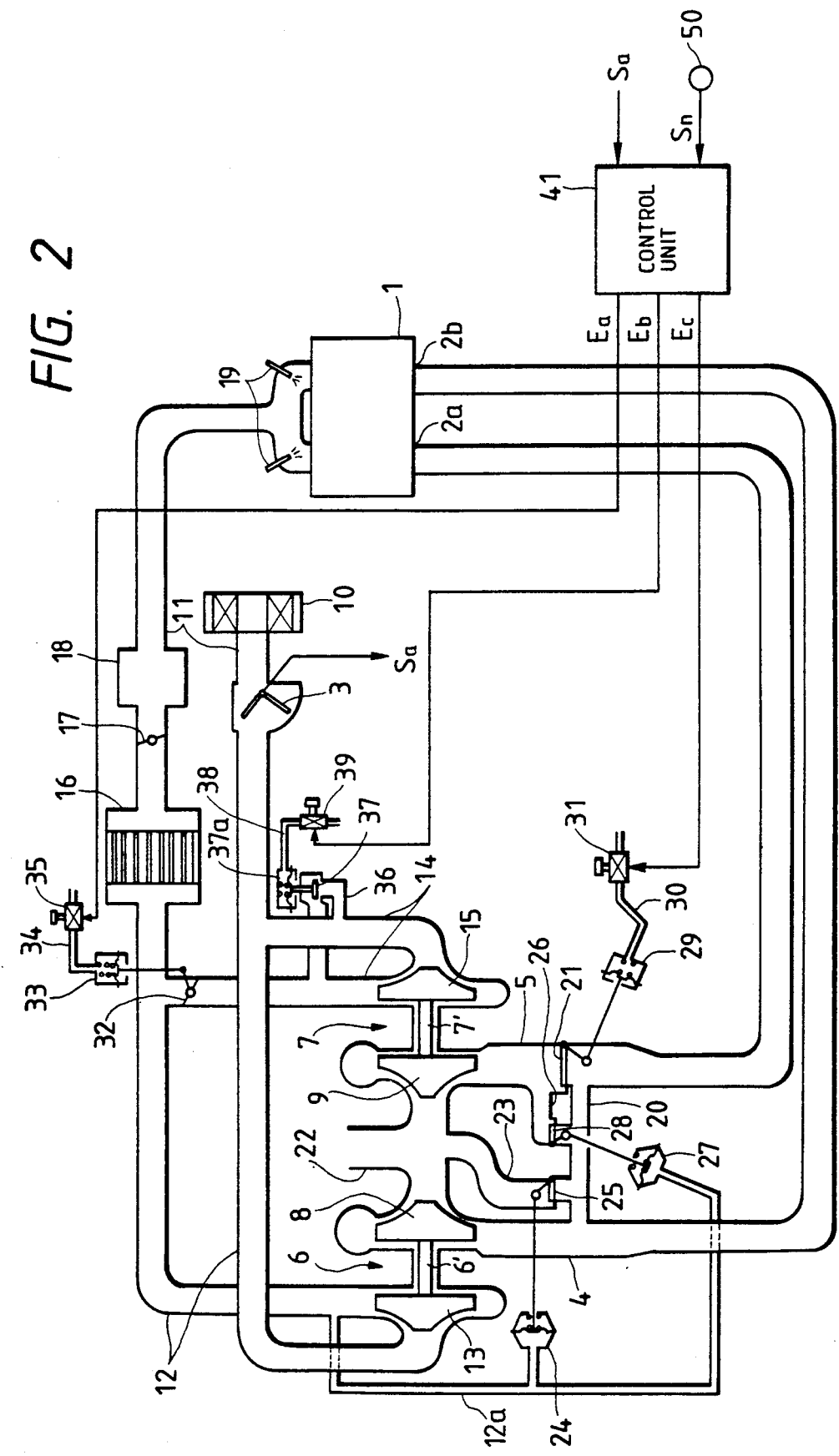
FIG. 2 is a schematic illustration showing an embodiment of air supply control system for an internal combustion engine according to the present invention, together with essential parts of an engine to which the embodiment is applied.

FIG. 2 illustrates a first embodiment of air supply control system according to the present invention, together with a part of an engine to which the first embodiment is applied.

Referring to FIG. 2, an internal combustion engine 1, which is, for example, a rotary engine having a couple of rotors each forming an operating chamber having the capacity of, for example, 654 cubic centimeters, is provided with first and second separated exhaust passages 4 and 5 which extend respectively from exhaust ports 2a and 2b provided on the engine 1 for discharging exhaust gas from the engine 1, and an intake passage 11 for supplying the engine 1 with intake air. The intake passage 11 includes first and second separated intake passages 12 and 14 which are branched from each other at a location downstream of an air flow sensor 3 provided for detecting intake air mass flow in the intake passage 11 at a position downstream of an air cleaner 10 and merged into each other at a location upstream of an intercooler 16 provided for cooling the intake air in the intake passage 11. A portion of the intake passage 11 downstream of the intercooler 16 is provided with a throttle valve 17, a surge chamber 18 and fuel injectors 19.

A primary turbosupercharger 6 is provided with a turbine 8 disposed in the first separated exhaust passage 4 to be driven to rotate by the exhaust gas and a blower 13 disposed in the first separated intake passage 12 and coupled through a rotating shaft 6' with the turbine 8. A secondary turbosupercharger 7 is also provided with a turbine 9 disposed in the second separated exhaust passage 5 to be driven to rotate by the exhaust gas and a blower 15 disposed in the second separated intake passage 14 and coupled through a rotating shaft 7' with the turbine 9.

An exhaust cutoff valve 21 is disposed in a portion of the second separated exhaust passage 5 upstream of the turbine 9. This exhaust cutoff valve 21 is driven by a diaphragm actuator 29 to be operative to close the second separated exhaust passage 5 in order to prevent the exhaust gas from being supplied to the turbine 9 so that only the primary turbosupercharger 6 works in a situation where intake air mass flow supplied to the engine 1 is relatively small.

A portion of the second separated exhaust passage 5 upstream of the exhaust cutoff valve 21 is connected through a connecting passage 20 with a portion of the first separated exhaust passage 4 upstream of the turbine 8. The connecting passage 20 is also connected with a portion of a common exhaust passage 22, which is coupled with the first and second separated exhaust passages 4 and 5 at a location downstream of the turbines 8 and 9, through a bypass passage 23 in which a waste gate valve 25 is provided. The waste gate valve 25 is driven by a diaphragm actuator 24 which has a pressure chamber coupled through a control pressure pipe 12a with a portion of the first separated intake passage 12 downstream of the blower 13.

The connecting passage 20 is further connected with a portion of the second separated exhaust passage 5 between the exhaust cutoff valve 21 and the turbine 9 through an exhaust bypass passage 26 in which an exhaust bypass valve 28 is provided. The exhaust bypass valve 28 is driven by a diaphragm actuator 27 having a pressure chamber coupled through the control pressure pipe 12a with the portion of the first separated intake passage 12 downstream of the blower 13.

An intake air cutoff valve 32 is disposed in a portion of the second separated intake passage 14 downstream of the blower 15. The second separated intake passage 14 is provided also with an intake air relief passage 36 detouring the blower 15 and having therein an intake air relief valve 37. The intake air cutoff valve 32 is driven by a diaphragm actuator 33 and the intake air relief valve 37 is driven by a diaphragm actuator 37a.

A control pressure pipe 30 extending from the diaphragm actuator 29 for driving the exhaust cutoff valve 21 is connected with an output port of a three-way solenoid valve 31, and a control pressure pipe 34 extending from the diaphragm actuator 33 for driving the intake air cutoff valve 32 is connected with an output port of a three-way solenoid valve 35. Further, a control pressure pipe 38 extending from the diaphragm actuator 37a for driving the intake air relief valve 37 is connected with an output port of a three-way solenoid valve 39.

Figure 3:
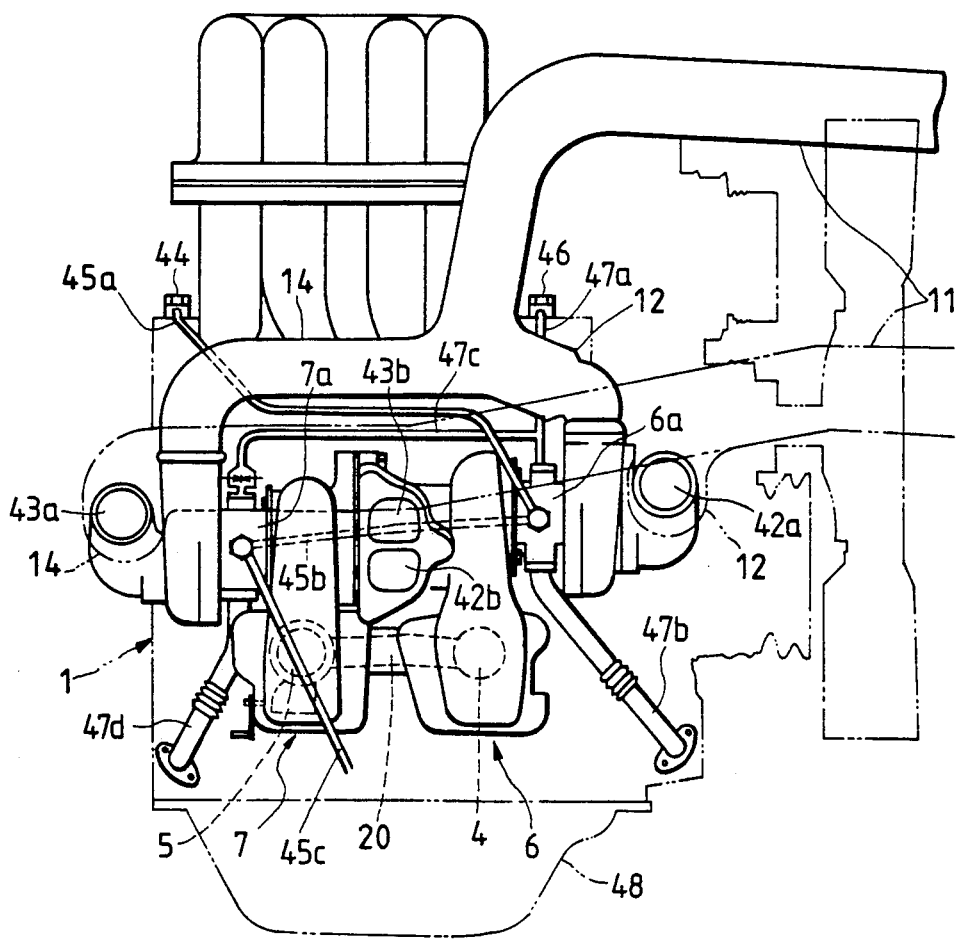
FIG. 3 is a schematic illustration showing a part of the embodiment shown in FIG. 2 which includes a couple of turbosuperchargers.

An arrangement including a cooling water passage and an oil passage provided for the primary and secondary turbosuperchargers 6 and 7 is shown in FIG. 3.

Referring to FIG. 3, the cooling water passage includes a cooling water drain 44 provided on the engine 1 and pipes 45a, 45b and 45c. A cooling water derived from the cooling water drain 44 is supplied through the pipe 45a to a bearing portion 6a supporting the rotating shaft 6' of the primary turbosupercharger 6 having an air inlet port 42a and an air outlet port 42b and then supplied further through the pipe 45b to a bearing portion 7a supporting the rotating shaft 7' of the secondary turbosupercharger 7 having an air inlet port 43a and an air outlet port 43b. The cooling water having passed through the bearing portions 6a and 7a successively returns through the pipe 45c to a water pump provided in the engine 1 (not shown in the drawings).

The oil passage includes an oil drain 46 provided on the engine 1 and pipes 47a, 47b, 47c and 47d. Oil derived from the oil drain 46 is supplied through the pipe 47a to the bearing portion 6a of the primary turbosupercharger 6 to pass through the bearing portion 6a from top to bottom and then returns through the pipe 47b to an oil pan 48 provided in the engine 1. The oil derived from the oil drain 46 is also supplied through the pipes 47a and 47c to the bearing portion 7a of the secondary turbosupercharger 7 to pass through the bearing portion 7a from top to bottom and then returns through the pipe 47d to the oil pan 48.

Referring back to FIG. 2, a control unit 41 constituted by a microcomputer is provided for controlling the three-way solenoid valves 31, 35 and 39 connected with the diaphragm actuators 29, 33 and 37a, respectively.

Figure 4:
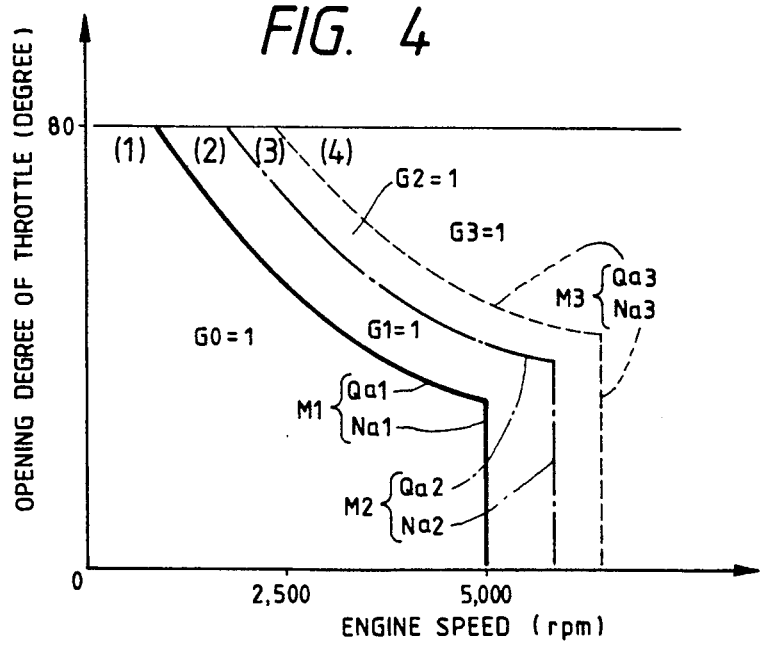
FIG. 4 is a characteristic chart used for explaining the operation of the embodiment shown in FIG. 2.

The control unit 41 is provided with detection output signals Sa and Sn obtained from the air flow sensor 3 and an engine speed sensor 50 for detecting the engine speed, respectively, and operative to produce control signals Ea to Ec selectively based on the detection output signals Sa and Sn and to supply the three-way solenoid valve 35 with the control signal Ea, the three-way solenoid valve 39 with the control signal Eb, and the three-way solenoid valve 31 with the control signal Ec, so as to control each of the intake air cutoff valve 32, intake air relief valve 37 and exhaust cutoff valve 21 in accordance with, for example, a characteristic chart for the operating condition of the engine 1 shown in FIG. 4.

The characteristic chart of FIG. 4 shows supercharger operating areas on a coordinate plane defined by an axis of abscissa representing engine speed and an axis of ordinate representing engine load embodied by opening degree of throttle and stored in the form of data map in a memory contained in the control unit 41. In the characteristic chart shown in FIG. 4, supercharger operating areas (1), (2), (3) and (4) partitioned by a boundary line M1 indicating the operating condition of engine in which the engine 1 operates with intake air mass flow Qa1 and the operating condition of engine in which the engine 1 operates at engine speed Na1, a boundary line M2 indicating the operating condition of engine in which the engine 1 operates with intake air mass flow Qa2 and the operating condition of engine in which the engine 1 operates at engine speed Na2, and a boundary line M3 indicating the operating condition of engine in which the engine 1 operates with intake air mass flow Qa3 and the operating condition of engine in which the engine 1 operates at engine speed Na3. Each of the supercharger operating areas (1), (2) and (3) is set to correspond to the operating condition of the engine 1 in which intake air mass flow fed to the combustion chambers formed in the engine 1 is to be relatively small and the supercharger operating area (4) is set to correspond to the operating condition of the engine 1 in which intake air mass flow fed to the combustion chambers formed in the engine 1 is to be relatively large.

When the operating condition of the engine 1 resides in the supercharger operating area (1) shown in FIG. 4, the control unit 41 is operative to keep each of the exhaust cutoff valve 21 and the intake air cutoff valve 32 closed and, contrary, the intake air relief valve 37 open, so that only the primary turbosupercharger 6 is caused to work for supercharging the engine 1. Then, when the operating condition of the engine 1 has moved into the supercharger operating area (2) shown in FIG. 4, the control unit 41 is operative to close the intake air relief valve 37. In process of this, before the intake air relief valve 37 is closed, the exhaust bypass valve 28 is opened when an air pressure at the portion downstream of the blower 13 in the first separated intake passage 12 is higher than a predetermined pressure value and thereby the exhaust gas is supplied slightly to the turbine 9 through the exhaust bypass passage 26 under a condition in which the intake air relief valve 37 is open. This results in that the turbine 9 is driven to rotate by the exhaust gas flowing through the exhaust bypass passage 26 so that the secondary turbosupercharger 7 is subjected to its preliminary rotation before the exhaust cutoff valve 21 is opened.

After that, when the operating condition of the engine 1 has moved into the supercharger operating area (3) shown in FIG. 4, the control unit 41 is operative to open the exhaust cutoff valve 21, and further, when the operating condition of the engine 1 has moved into the supercharger operating area (4) shown in FIG. 4, the control unit 41 is operative to open the intake air cutoff valve 32, so that the turbine 8 of the primary turbosupercharger 6 and the turbine 9 of the secondary turbosupercharger 7 are driven to rotate by the exhaust gas passing through the first and second separated exhaust passages 4 and 5 respectively and thereby both the primary and secondary turbosuperchargers 6 and 7 are caused to work for supercharging the engine 1.

As described above, since the secondary turbosupercharger 7 is rotated preliminarily by the exhaust gas supplied thereto through the exhaust bypass valve 28 under the condition in which the intake air relief valve 37 is open before it commences to work for supercharging the engine 1 and the intake air relief valve 37 is closed before the exhaust cutoff valve 21 is opened, the secondary turbosupercharger 7 under the sufficiently high preliminary rotation commences to work for supercharging the engine 1, and consequently, the response in supercharging by the secondary turbosupercharger 7 is improved and torque shock arising on the engine 1 is surely suppressed when the secondary turbosupercharger 7 commences to work for supercharging the engine 1. Further, the secondary turbosupercharger 7 can be arranged to be large in supercharging capacity so as to be mated with the primary turbosupercharger 6 which is arranged to be relatively small in supercharging capacity to have a superior response in supercharging.

Figure 5:
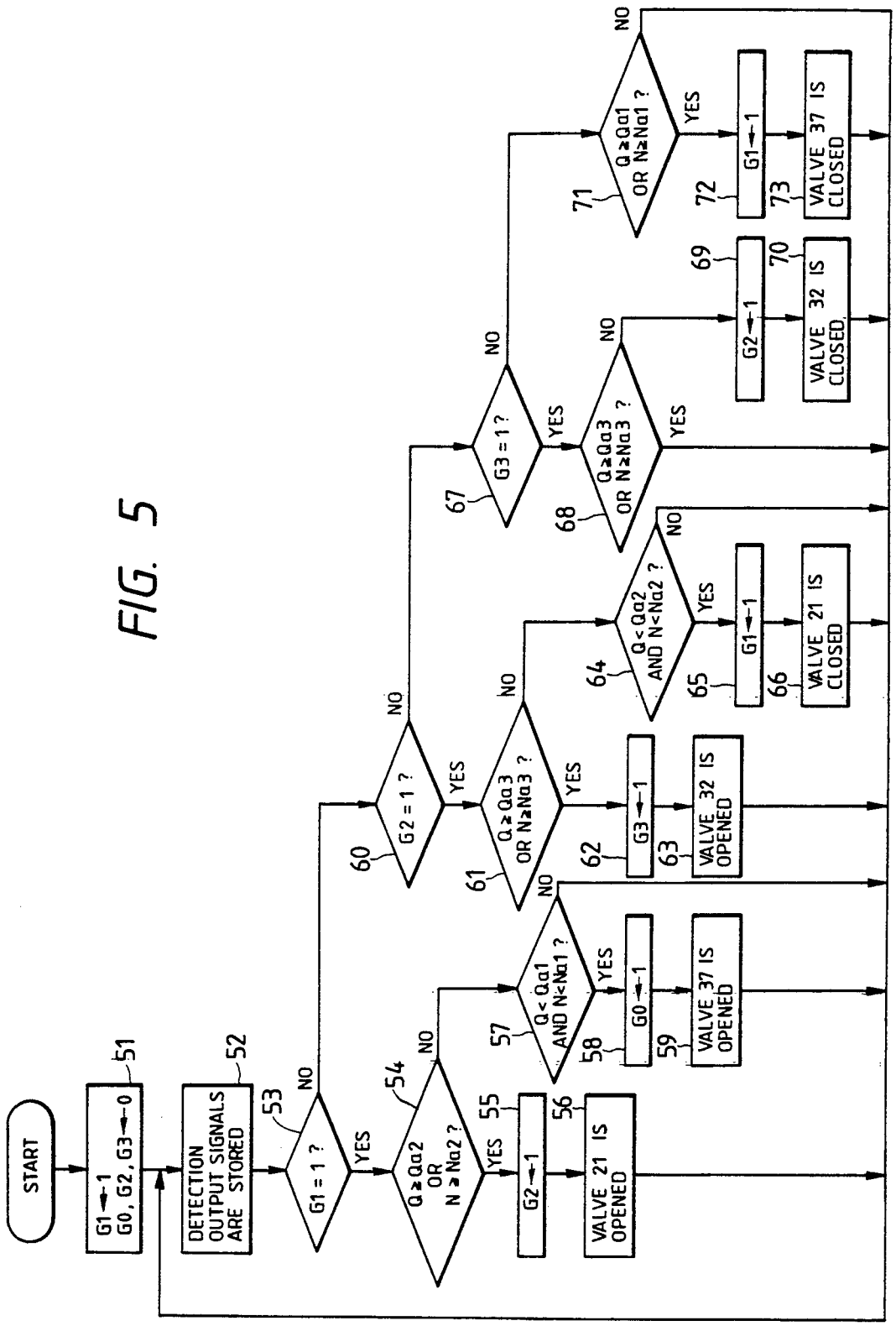
FIG. 5 is a flow chart used for explaining the operation of the embodiment shown in FIG. 2.

One example of an operation program for controlling the exhaust cutoff valve 21, intake air cutoff valve 32, and intake air relief valve 37 as described above is carried out in the control unit 41 in accordance with a flow chart shown in FIG. 5.

According to the flow chart shown in FIG. 5, first, in step 51, an initial arrangement for setting a flag G1 to be 1 and setting each of flags G0, G2 and G3 to be 0 is conducted. As shown in FIG. 4, after the initial arrangement, the flag G0 is set to be 1 and each of the flags G1 to G3 is set to be 0 when the operating condition of the engine 1 resides in the supercharger operating area (1), the flag G1 is set to be 1 and each of the flags G0, G2 and G3 is set to be 0 when the operating condition of the engine 1 resides in the supercharger operating area (2), the flag G2 is set to be 1 and each of the flags G0, G1 and G3 is set to be 0 when the operating condition of the engine 1 resides in the supercharger operating area (3), and the flag G3 is set to be 1 and each of the flags G0 to G2 is set to be 0 when the operating condition of the engine 1 resides in the supercharger operating area (4).

Next, in step 52, the detection output signals Sa and Sn obtained from the sensors 3 and 50 are stored. Then, in step 53, it is checked whether the flag G1 is 1 or not. If the flag G1 is 1, it is checked whether intake air mass flow Q represented by the detection output signal Sa is equal to or larger than the intake air mass flow Qa2 or not and whether engine speed N represented by the detection output signal Sn is equal to or higher than the engine speed Na2 or not, in step 54. When the intake air mass flow Q is equal to or larger than the intake air mass flow Qa2 or the engine speed N is equal to or higher than the engine speed Na2, the flag G2 is set to be 1, in step 55, and the control signal Ec is supplied to the three-way solenoid valve 31 so as to open the exhaust cutoff valve 21, in step 56, then the process returns to the step 52.

If it is clarified in the step 54 that the intake air mass flow Q is smaller than the intake air mass flow Qa2 and the engine speed N is lower than the engine speed Na2, it is checked whether the intake air mass flow Q is smaller than the intake air mass flow Qa1 or not and whether the engine speed N is lower than the engine speed Na1 or not, in step 57. When the intake air mass flow Q is smaller than the intake air mass flow Qa1 and the engine speed N is lower than the engine speed Na1, the flag G0 is set to be 1, in step 58, and the control signal Eb is supplied to the three-way solenoid valve 39 so as to open the intake air relief valve 37, in step 59, then the process returns to the step 52. To the contrary, when the intake air mass flow Q is equal to or larger than the intake air mass flow Qa1 or the engine speed N is equal to or higher than the engine speed Na1, the process returns to the step 52.

If it is clarified in the step 53 that the flag G1 is not 1, it is further checked whether the flag G2 is 1 or not, in step 60. As a result of the decision in the step 60, if the flag G2 is 1, it is checked whether the intake air mass flow Q is equal to or larger than the intake air mass flow Qa3 or not and whether engine speed N is equal to or higher than the engine speed Na3 or not, in step 61. When the intake air mass flow Q is equal to or larger than the intake air mass flow Qa3 or the engine speed N is equal to or higher than the engine speed Na3, the flag G3 is set to be 1, in step 62, and the control signal Ea is supplied to the three-way solenoid valve 35 so as to open the intake air cutoff valve 32, in step 63, then the process returns to the step 52.

If it is clarified in the step 61 that the intake air mass flow Q is smaller than the intake air mass flow Qa3 and the engine speed N is lower than the engine speed Na3, it is checked whether the intake air mass flow Q is smaller than the intake air mass flow Qa2 or not and the engine speed N is lower than the engine speed Na2 or not, in step 64. When the intake air mass flow Q is smaller than the intake air mass flow Qa2 and the engine speed N is lower than the engine speed Na2, the flag G1 is set to be 1, in step 65, and the control signal Ec is supplied to the three-way solenoid valve 31 so as to close the exhaust cutoff valve 21, in step 66, then the process returns to the step 52. To the contrary, when the intake air mass flow Q is equal to or larger than the intake air mass flow Qa2 or the engine speed N is equal to or higher than the engine speed Na2, the process returns to the step 52.

If it is clarified in the step 60 that the flag G2 is not 1, it is further checked whether the flag G3 is 1 or not, in step 67. As a result of the decision in the step 67, if the flag G3 is 1, it is checked whether the intake air mass flow Q is equal to or larger than the intake air mass flow Qa3 or not and whether engine speed N is equal to or higher than the engine speed Na3 or not, in step 68. When the intake air mass flow Q is equal to or larger than the intake air mass flow Qa3 or the engine speed N is equal to or higher than the engine speed Na3, the process returns to the step 52. To the contrary, when the intake air mass flow Q is smaller than the intake air mass flow Qa3 and the engine speed N is lower than the engine speed Na3, the flag G2 is set to be 1, in step 69, and the control signal Ea is supplied to the three-way solenoid valve 35 so as to close the intake air cutoff valve 32, in step 70, then the process returns to the step 52.

Further, if it is clarified in the step 67 that the flag G3 is not 1, it is checked whether the intake air mass flow Q is equal to or larger than the intake air mass flow Qa1 or not and whether engine speed N is equal to or higher than the engine speed Na1 or not, in step 71. When the intake air mass flow Q is equal to or larger than the intake air mass flow Qa1 or the engine speed N is equal to or higher than the engine speed Na1, the flag G1 is set to be 1, in step 72, and the control signal Eb is supplied to the three-way solenoid valve 39 so as to close the intake air relief valve 37, in step 73, then the process returns to the step 52. To the contrary, when the intake air mass flow Q is smaller than the intake air mass flow Qa1 and the engine speed N is lower than the engine speed Na1, the process returns to the step 52.

In the embodiment shown in FIG. 2 as aforementioned, it is possible to modify the operations of the exhaust cutoff valve 21 and the intake air relief valve 37 so that the intake air relief valve 37 is closed at the time point at which the exhaust cutoff valve 21 is opened on the occasion of the start of the supercharging operation of the secondary turbosupercharger 7, and further it is also possible to use a supercharger other than a turbosupercharger in place of the primary turbosupercharger 6.

Figure 6:
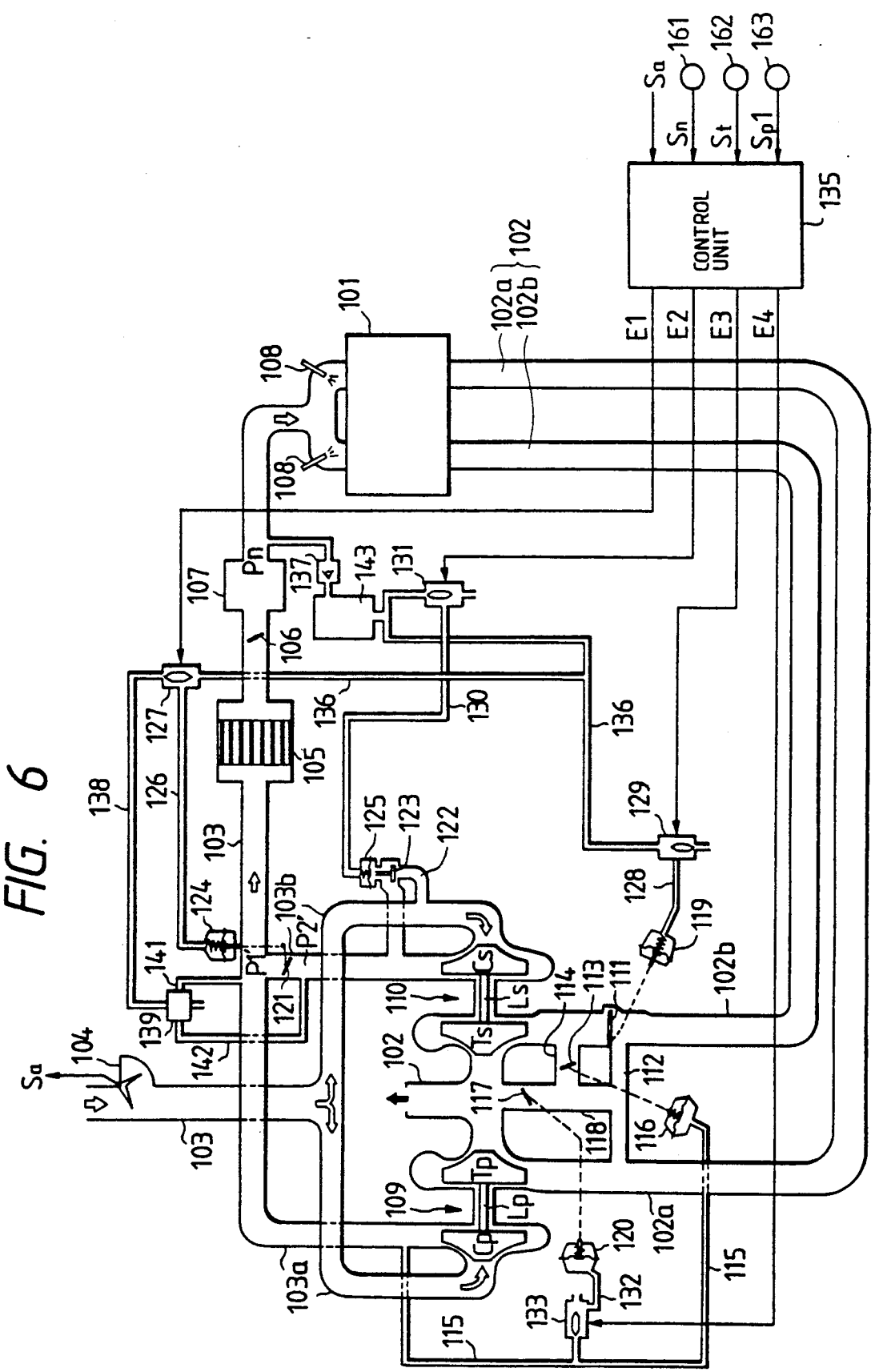
FIG. 6 is a schematic illustration showing another embodiment of air supply control system for an internal combustion engine according to the present invention, together with essential parts of an engine to which the embodiment is applied.

FIG. 6 illustrates another embodiment of air supply control system according to the present invention, together with a part of an engine to which the embodiment is applied.

Referring to FIG. 6, an internal combustion engine 101, which is, for example, a rotary engine having a couple of rotors each forming an operating chamber having the capacity of, for example, 654 cubic centimeters and with which a transmission operative to take selectively a plurality of speed ranges therein is connected, is provided with an exhaust passage 102 for discharging exhaust gas from the engine 101 and an intake passage 103 for supplying the engine 101 with intake air. The exhaust passage 102 includes first and second separated exhaust passages 102a and 102b, and the intake passage 103 includes first and second branched intake passages 103a and 103b which are separated from each other at a location downstream of an air flow sensor 104 provided for detecting intake air mass flow in the intake passage 103 and merged into each other at a location upstream of an intercooler 105 provided for cooling the intake air in the intake passage 103. A portion of the intake passage 103 downstream of the intercooler 105 is provided with a throttle valve 106, a surge chamber 107 and fuel injectors 108.

A primary turbosupercharger 109 is provided with a turbine Tp disposed in the first separated exhaust passage 102a to be driven to rotate by the exhaust gas and a blower Cp disposed in the first branched intake passage 103a and coupled through a rotating shaft Lp with the turbine Tp. A secondary turbosupercharger 110 is also provided with a turbine Ts disposed in the second separated exhaust passage 102b to be driven to rotate by the exhaust gas and a blower Cs disposed in the second branched intake passage 103b and coupled through a rotating shaft Ls with the turbine Ts.

A portion of the first branched intake passage 103a upstream of the blower Cp and a portion, of the second branched intake passage 103b upstream of the blower Cs are arranged in a line to form a branched portion, so that pressure waves produced in one of the first and second branched intake passages 103a and 103b are easy to propagate to the other of the first and second branched intake passages 103a and 103b but hard to propagate toward the air flow sensor 104.

An exhaust cutoff valve 111 is disposed in a portion of the second separated exhaust passage 102b upstream of the turbine Ts. This exhaust cutoff valve 111 is operative to close the second separated exhaust passage 102b in order to prevent the exhaust gas from being supplied to the turbine Ts so that only the primary turbosupercharger 109 works in a situation where intake air mass flow supplied to the engine 101 is relatively small.

A portion of the second separated exhaust passage 102b upstream of the exhaust cutoff valve 111 is connected through a connecting passage 112 with a portion of the first separated exhaust passage 102a upstream of the turbine Tp. The connecting passage 112 is also connected with a portion of the exhaust passage 102 downstream to the turbines Tp and Ts through a bypass passage 118 in which a waste gate valve 117 is provided. A portion of the bypass passage 118 upstream of the waste gate valve 117 is connected with a portion of the second separated exhaust passage 102b between the exhaust cutoff valve 111 and the turbine Ts through an exhaust bypass passage 114 in which an exhaust snifting valve 113 is provided.

The exhaust bypass valve 113 is driven by a diaphragm actuator 116 and a pressure chamber of the diaphragm actuator 116 is coupled through a control pressure pipe 115 with a portion of the first branched intake passage 103a downstream of the blower Cp.

An intake air cutoff valve 121 is disposed in a portion of the second branched intake passage 103b downstream of the blower Cs. The second branched intake passage 103b is provided also with an intake air relief passage 122 detouring the turbine Ts and having therein an intake air relief valve 123. The intake air cutoff valve 121 is driven by a diaphragm actuator 124, and the intake air relief valve 123 is driven by a diaphragm actuator 125.

A control pressure pipe 126 extending from the diaphragm actuator 124 for driving the intake air cutoff valve 121 is connected with an output port of a three-way solenoid valve 127, and a control pressure pipe 128 extending from a diaphragm actuator 119 for driving the exhaust cutoff valve 111 is connected with an output port of a three-way solenoid valve 129. Further, a control pressure pipe 130 extending from the diaphragm actuator 125 for driving the intake air relief valve 123 is connected with an output port of a three-way solenoid valve 131, and a control pressure pipe 132 extending from a diaphragm actuator 120 for driving the waste gate valve 117 is connected with an output port of a three-way solenoid valve 133. The three-way solenoid valves 127, 129, 131 and 133 are controlled by a control unit 135 constituted by a microcomputer.

The control unit 135 is provided with detection output signals Sa, Sn, St and Sp1 obtained from the air flow sensor 104, an engine speed sensor 161 for detecting the engine speed, a throttle sensor 162 for detecting opening degree of the throttle valve 106 (opening degree of throttle), and an air pressure sensor 163 for detecting an air pressure P1' at a portion downstream of the blower Cp in the first branched intake passage 103a, respectively, and operative to produce control signals E1 to E4 selectively based on the detection output signals Sa, Sn, St and Sp1 and to supply the three-way solenoid valve 127 with the control signal E1, the three-way solenoid valve 131 with the control signal E2, the three-way solenoid valve 129 with the control signal E3, and the three-way solenoid valve 133 with the control signal E4.

One of input ports of the three-way solenoid valve 129 is open to the atmosphere and the other of the input ports is connected through a pipe 136 with a negative pressure tank 143 to which negative pressure at a portion downstream of the throttle valve 106 in the intake passage 103 is supplied through a check valve 137. One of input ports of the three-way solenoid valve 127 is connected through the pipe 136 with the negative pressure tank 143 and the other of the input ports is connected through a pipe 138 with a pressure difference detecting valve 139.

Figure 7:
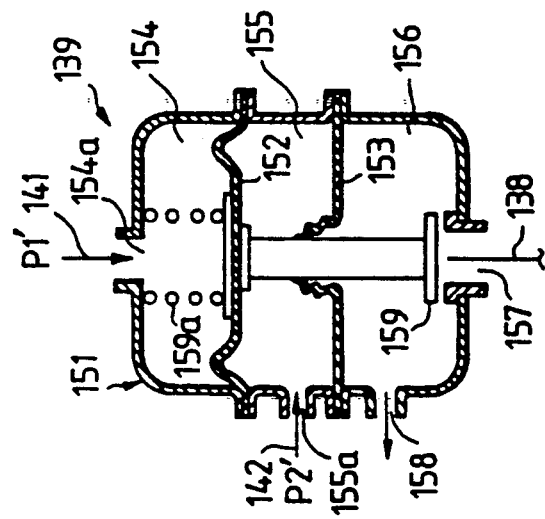
FIG. 7 is a schematic illustration showing a pressure difference detecting valve employed in the embodiment shown in FIG. 6.

As shown in FIG. 7, the pressure difference detecting valve 139 has a housing 151 in which three chambers 154, 155 and 156 are formed with diaphragms 152 and 153. The chambers 154 and 155 are provided with input ports 154a and 155a, respectively, and the chamber 156 is provided with an open port 158 and an output port 157 connected with the pipe 138. The input port 154a is connected through a pipe 141 with the portion of the first branched intake passage 103a downstream of the blower Cp so as to be supplied with the air pressure P1', and the input port 155a is connected through a pipe 142 with a portion of the second branched intake passage 103b upstream of the intake air cutoff valve 121 so as to be supplied with an air pressure P2' at a portion upstream of the intake air cutoff valve 121 in the second branched intake passage 103b.

The pressure difference detecting valve 139 is provided further with a valve body 159 connected with the diaphragms 152 and 153 and biased by a spring 159a disposed in the chamber 154. This valve body 159 is operative to keep the output port 157 open so as to open the chamber 156 to the atmosphere when a pressure difference between the air pressures P1' and P2' is relatively large and keep the output port 157 closed when the pressure difference between the air pressures P1' and P2' is equal to or smaller than a predetermined pressure value $\Delta P'$. Accordingly, when the control pressure pipe 126 is communicated with the pipe 138 through the three-way solenoid valve 127 controlled by the control signal E1 and the pressure difference between the air pressures P1' and P2' is larger than the predetermined pressure value $\Delta P'$, the diaphragm actuator 124 is opened to the atmosphere and thereby the intake air cutoff valve 121 is opened. On the other hand, when the control pressure pipe 126 is communicated with the pipe 136 through the three-way solenoid valve 127 controlled by the control signal E1, the negative pressure is applied to the diaphragm actuator 124 and thereby the intake air cutoff valve 121 is closed.

When the control pressure pipe 128 is communicated with the pipe 136 through the three-way solenoid valve 129 controlled by the control signal E3, the negative pressure is applied to the diaphragm actuator 119 and thereby the exhaust cutoff valve 111 is closed, so that only the primary turbosupercharger 109 is caused to work. On the other hand, when the control pressure pipe 128 is opened to the atmosphere through the three-way solenoid valve 129 controlled by the control signal E3, the exhaust cutoff valve 111 is opened, so that the secondary turbosupercharger 110 is caused to work.

Figure 8:
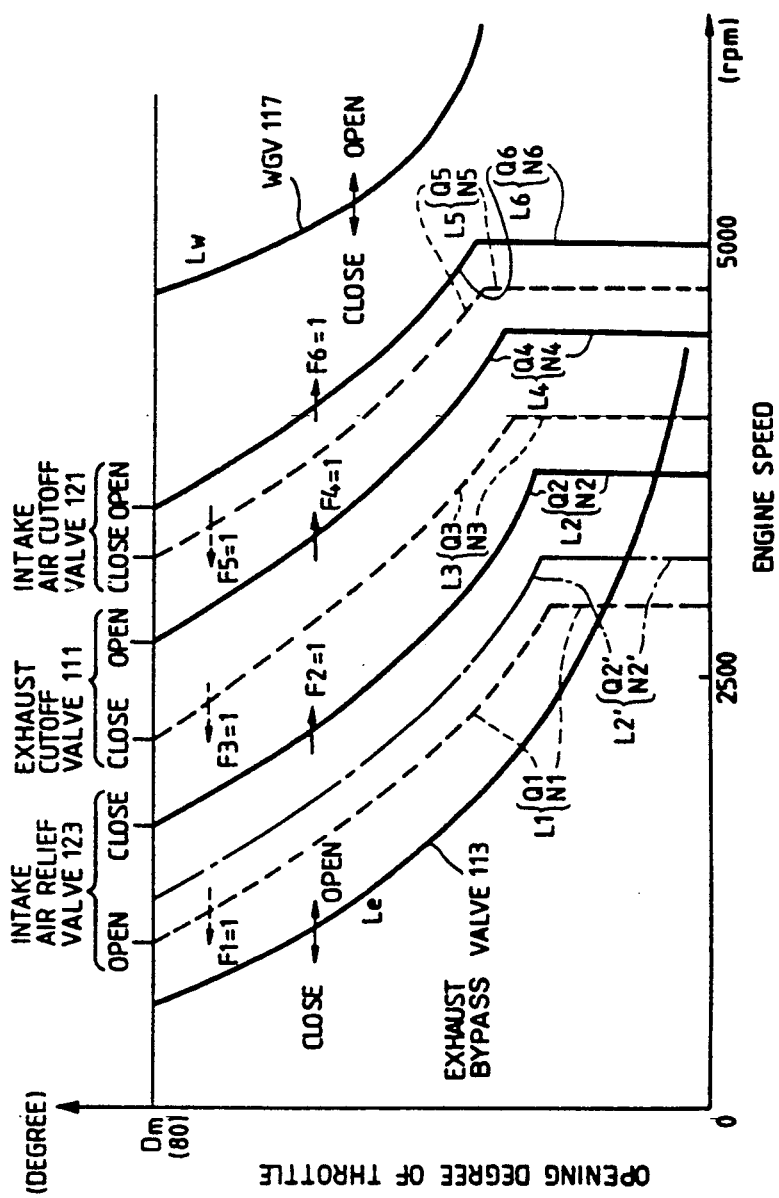
FIG. 8 is a characteristic chart used for explaining the operation of various valves employed in the embodiment shown in FIG. 6.

FIG. 8 is a characteristic chart showing the operating conditions of the exhaust cutoff valve 111, exhaust bypass valve 113, waste gate valve 117, intake air cutoff valve 121 and intake air relief valve 123. This characteristic chart of FIG. 8 has an axis of abscissa representing engine speed and an axis of ordinate representing engine load embodied by opening degree of throttle, the maximum value of which is indicated by Dm, and is stored in the form of data map in a memory contained in the control unit 135.

According to the characteristic chart of FIG. 8, the waste gate valve 117 is changed to be open from close and to be close from open in accordance with a line Lw in common, and the exhaust bypass valve 113 is changed to be open from close and to be close from open in accordance with a line Le in common. On the other hand, the intake air relief valve 123 is changed to be open from close in accordance with a line L1 which indicates the operating condition of engine in which the engine 101 operates with intake air mass flow Q1 and the operating condition of engine in which the engine 101 operates at engine speed N1 and to be close from open in accordance with a line L2 which indicates the operating condition of engine in which the engine 101 operates with intake air mass flow Q2 and the operating condition of engine in which the engine 101 operates at engine speed N2, the exhaust cutoff valve 111 is changed to be close from open in accordance with a line L3 which indicates the operating condition of engine in which the engine 101 operates with intake air mass flow Q3 and the operating condition of engine in which the engine 101 operates at engine speed N3 and to be open from close in accordance with a line L4 which indicates the operating condition of engine in which the engine 101 operates with intake air mass flow Q4 and the operating condition of engine in which the engine 101 operates at engine speed N4, and the intake air cutoff valve 121 is changed to be close from open in accordance with a line L5 which indicates the operating condition of engine in which the engine 101 operates with intake air mass flow Q5 and the operating condition of engine in which the engine 101 operates at engine speed N5 and to be open from close in accordance with a line L6 which indicates the operating condition of engine in which the engine 101 operates with intake air mass flow Q6 and the operating condition of engine in which the engine 101 operates at engine speed N6.

The three-way solenoid valve 131 has its input ports, one of which is opened to the atmosphere and the other of which is connected with the negative pressure tank 143. In the case where the engine speed is relatively low, the negative pressure Pn is applied through the three-way solenoid valve 131 and the control pressure pipe 130 to the intake air relief valve 123 and whereby the intake air relief valve 123 keeps the intake air relief passage 122 open. Then, the three-way solenoid valve 131 is changed to open the control pressure pipe 130 to the atmosphere by the control signal E2 from the control unit 135, so that the intake air relief valve 123 shuts the intake air relief passage 122, before the exhaust cutoff valve 111 and the intake air cutoff valve 121 are opened during the period of time in which the engine speed is increasing, as shown in FIG. 8.

On the characteristic chart of FIG. 8, an operating area having the line L6 as a lower boundary is set to correspond to the operating condition of the engine 101 in which intake air mass flow fed to the combustion chambers formed in the engine 101 is to be relatively large, and each of an operating area between the lines L4 and L6, an operating area between the lines L2 and L4, and operating area having the line L2 as a upper boundary is set to correspond to the operating condition of the engine 101 in which intake air mass flow fed to the combustion chambers formed in the engine 101 is to be relatively small.

When the operating condition of the engine 101 resides in the operating area having the line L2 as a upper boundary, the control unit 135 is operative to keep each of the exhaust cutoff valves 111 and the intake air cutoff valve 121 closed and, contrary, the intake air relief valve 123 open, so that only the primary turbosupercharger 109 is caused to work for supercharging the engine 101. Then, when the intake air mass flow in the engine 101 has increased to cross the line L2 and the operating condition of the engine 101 has moved into the operating area between the lines L2 and L4, the control unit 135 is operative to close the intake air relief valve 123. In process of this, before the intake air relief valve 123 is closed, the exhaust bypass valve 113 is opened when the intake air mass flow in the engine 101 has increased to cross the line Le and thereby the exhaust gas is supplied slightly to the turbine Ts of the secondary turbosupercharger 110 through the exhaust bypass passage 114 under a condition in which the intake air relief valve 123 is open. This results in that the turbine Ts is driven to rotate by the exhaust gas flowing through the exhaust bypass passage 114 so that the secondary turbosupercharger 110 is subjected to its preliminary rotation before the exhaust cutoff valve 111 is opened.

After that, when the intake air mass flow in the engine 101 has further increased to cross the line L4 and the operating condition of the engine 101 has moved into the operating area between the lines L4 and L6, the control unit 135 is operative to open the exhaust cutoff valve 111, and then, when the intake air mass flow in the engine 101 has still further increased to cross the line L6 and the operating condition of the engine 101 has moved into the operating area having the line L6 as a lower boundary, the control unit 135 is operative to open the intake air cutoff valve 121, so that the turbine Tp of the primary turbosupercharger 109 and the turbine Ts of the secondary turbosupercharger 110 are driven to rotate by the exhaust gas passing through the first and second separated exhaust passages 102a and 102b respectively and thereby both the primary and secondary turbosuperchargers 109 and 110 are caused to work for supercharging the engine 101.

As described above, since the secondary turbosupercharger 110 is rotated preliminarily by the exhaust gas supplied thereto through the exhaust bypass valve 113 under the condition in which the intake air relief valve 123 is open before it commences to work for supercharging the engine 101 and the intake air relief valve 123 is closed before the exhaust cutoff valve 111 is opened, the secondary turbosupercharger 110 under the sufficiently high preliminary rotation commences to work for supercharging the engine 101, and consequently, the response in supercharging by the secondary turbosupercharger 110 is improved and torque shock arising on the engine 101 is surely suppressed when the secondary turbosupercharger 110 commences to work for supercharging the engine 101.

In this embodiment, when the engine 101 is rather rapidly accelerated, the control unit 135 is operative substantially to shift the line L2 on the characteristic chart shown in FIG. 8 toward the line L1 so to be a line L2' which indicates the operating condition of engine in which the engine 101 operates with intake air mass flow Q2' smaller than the intake air mass flow Q2 and the operating condition of engine in which the engine 101 operates at engine speed N2' lower than the engine speed N2. In such a case, the time point at which the intake air relief valve 123 is closed after the preliminary rotation of the secondary turbosupercharger 110 has started is advanced, so that the speed of the preliminary rotation of the secondary turbosupercharger 110 is quickly increased.

The acceleration of the engine 101 is detected, for example, based on a variation rate of intake air mass flow (dQ/dt), which becomes equal to or more than a predetermined value when the engine 101 is rather rapidly accelerated.

The air pressure P1' is applied through the control pressure pipe 115 extending from the diaphragm actuator 116 to one of input ports of the three-way solenoid valve 133. When the engine speed and the opening degree of throttle are equal to or more than respective predetermined values and the air pressure P1' is equal to or higher than a predetermined pressure value, the three-way solenoid valve 133 is opened by the control signal E4 from the control unit 135 so as to apply the air pressure P1' to the diaphragm actuator 120 and thereby the diaphragm actuator 120 causes the waste gate valve 117 to make the bypass passage 118 open. The other of input ports of the three-way solenoid valve 133 is opened to the atmosphere and the waste gate valve 117 shuts the bypass passage 118 when the diaphragm actuator 120 is opened to the atmosphere through the three-way solenoid valve 133.

One example of an operation program for controlling the exhaust cutoff valve 111, intake air cutoff valve 121 and intake air relief valve 123 as described above is carried out in the control unit 135 in accordance with a flow chart shown in FIGS. 9-a, 9-b and 9-c.

According to the flow chart shown in FIGS. 9-a, 9-b and 9-c, first, in step 171, an initial arrangement for setting a flag F1 to be 1 and setting each of flags F2 to F6 to be 0 is conducted. As shown in FIG. 8, after the initial arrangement, the flag F1 is set to be 1 and each of the flags F2 to F6 is set to be 0 when the intake air mass flow or the engine speed is decreased to cross the line L1 the flag F2 is set to be 1 and each of the flags F1 and F3 to F6 is set to be 0 when the intake air mass flow or the engine speed is increased to cross the line L2, the flag F3 is set to be 1 and each of the flags F1, F2 and F4 to F6 is set to be 0 when the intake air mass flow or the engine speed is decreased to cross the line L3, the flag F4 is set to be 1 and each of the flags F1 to F3, F5 and F6 is set to be 0 when the intake air mass flow or the engine speed is increased to cross the line L4, the flag F5 is set to be 1 and each of the flags F1 to F4 and F6 is set to be 0 when the intake air mass flow or the engine speed is decreased to cross the line L5, and the flag F6 is set to be 1 and each of the flags F1 to F5 is set to be 0 when the intake air mass flow or the engine speed is increased to cross the line L6.

Then, in step 172, the detection output signals Sa, Sn, St and Sp1 obtained from the sensors 104, 161, 162 and 163 are stored. Further, the intake air mass flow Q1 and the engine speed N1 representing the line L1, the intake air mass flow Q2 and the engine speed N2 representing the line L2, the intake air mass flow Q3 and the engine speed N3 representing the line L3, the intake air mass flow Q4 and the engine speed N4 representing the line L4, the intake air mass flow Q5 and the engine speed N5 representing the line L5, and the intake air mass flow Q6 and the engine speed N6 representing the line L6 are stored, in step 173.

After that, in step 174, it is checked whether the variation rate of intake air mass flow (dQ/dt), which is obtained based on the detection output signal Sa representing intake air mass flow Q in the intake passage 103, is lager than a predetermined value AA or not. If the variation rate of intake air mass flow dQ/dt is larger than the predetermined value AA, the intake air mass flow Q2 and the engine speeds N2 stored in the process 173 are modified respectively to shift the line L2 toward the line L1 so as to be a line L2', in process 175. The modification of the intake air mass flow Q2 is performed by subtracting a predetermined modifying value ΔQ2 from the intake air mass flow Q2 so that the intake air mass flow Q2 is changed into a modified intake air mass flow Q2' and the modification of the engine speed N2 is performed by subtracting a predetermined modifying value ΔN2 from the engine speed N2 so that the engine speed N2 is changed into a modified engine speed N2'.

Then, in step 176, it is checked whether the flag F1 is 1 or not. When the flag F1 is 1, it is checked whether the intake air mass flow Q is larger then the intake air mass flow Q2 or not, in step 177. If the intake air mass flow Q is equal to or smaller than the intake air mass flow Q2, it is checked whether engine speed N represented by the detection output signal Sn is higher than the engine speed N2 or not, in step 178.

When it is clarified in the step 177 that the intake air mass flow Q is larger than the intake air mass flow Q2 or it is clarified in the step 178 that the engine sped N is higher than the engine speed N2, the flag F2 is set to be 1 in step 179, and the control signal E2 is supplied to the three-way solenoid valve 131 so that the intake air relief valve 123 is closed, in step 180, then the process returns to the process 172. On the other hand, the engine speed N is equal to or lower than the engine speed N2 as a result of the check in the step 178, the process returns to the process 172 directly from the step 178.

If it is clarified in the step 174 that the variation rate of intake air mass flow dQ/dt is equal to or smaller than the predetermined value AA or it is clarified in the step 176 that the flag F1 is 0, it is checked whether the flag F2, F4 or F6 is 1 or not in step 181. When the flag F2, F4 or F6 is 1, it is further checked whether the flag F2 is 1 or not in step 182. Then, if the flag F2 is 1, it is checked whether the intake air mass flow Q is larger then the intake air mass flow Q4 or not, in step 183. If the intake air mass flow Q is equal to or smaller than the intake air mass flow Q4, it is checked whether the engine speed N is higher than the engine speed N4 or not, in step 184.

When it is clarified in the step 183 that the intake air mass flow Q is larger than the intake air mass flow Q4 or it is clarified in the step 184 that the engine speed N is higher than the engine speed N4, the flag F4 is set to be 1 in step 185, and the control signal E3 is supplied to the three-way solenoid valve 129 so that the exhaust cutoff valve 111 is opened, in step 186, then the process returns to the process 172.

On the other hand, the engine speed N is equal to or lower than the engine speed N4 as a result of the check in the step 184, it is checked whether the intake air mass flow Q is smaller than the intake air mass flow Q1 or not, in step 187. If the intake air mass flow Q is smaller than the intake air mass flow Q1, it is further checked that the engine speed N is lower than the engine speed N1 or not, in step 188. When it is clarified in the step 187 that the intake air mass flow Q is equal to or larger than the intake air mass flow Q1 or it is clarified in the step 188 that the engine speed N is equal to or higher than the engine speed N1, the process returns to the step 172. On the other hand, if the engine speed N is lower than the engine speed N1 as a result of the check in the step 188, the flag F1 is set to be 1 in step 189, and the control signal E2 is supplied to the three-way solenoid valve 131 so that the intake air relief valve 123 is opened, in step 190, then the process returns to the step 172.

When it is clarified in the step 182 that the flag F2 is 0, it is checked whether the flag F4 is 1 or not in step 191. Then, if the flag F4 is 1, it is checked it is checked whether the intake air mass flow Q is larger then the intake air mass flow Q6 or not, in step 192. If the intake air mass flow Q is equal to or smaller than the intake air mass flow Q6, it is checked whether the engine speed N is higher than the engine speed N6 or not, in step 193.

When it is clarified in the step 192 that the intake air mass flow Q is larger than the intake air mass flow Q6 or it is clarified in the step 193 that the engine speed N is higher than the engine speed N6, the flag F6 is set to be 1 in step 194, and the control signal E1 is supplied to the three-way solenoid valve 127 so that the intake air cutoff valve 121 is opened, in step 195, then the process returns to the process 172. To the contrary, the engine speed N is equal to or lower than the engine speed N6 as a result of the check in the step 193, it is checked whether the intake air mass flow Q is smaller than the intake air mass flow Q3 or not, in step 196. If the intake air mass flow Q is smaller than the intake air mass flow Q3, it is further checked that the engine speed N is lower than the engine speed N3 or not, in step 197. When it is clarified in the step 196 that the intake air mass flow Q is equal to or larger than the intake air mass flow Q3 or it is clarified in the step 197 that the engine speed N is equal to or higher than the engine speed N3, the process returns to the step 172.

On the other hand, if the engine speed N is lower than the engine speed N3 as a result of the check in the step 197, the flag F3 is set to be 1 in step 198, and the control signal E3 is supplied to the three-way solenoid valve 129 so that the exhaust cutoff valve 111 is closed, in step 199, then the process returns to the step 172.

If it is clarified in the step 191 that the flag F4 is 0, it is checked whether the intake air mass flow Q is smaller than the intake air mass flow Q5 or not, in step 200. If the intake air mass flow Q is smaller than the intake air mass flow Q5, it is further checked that the engine speed N is lower than the engine speed N5 or not, in step 201. When it is clarified in the step 200 that the intake air mass flow Q is equal to or larger than the intake air mass flow Q5 or it is clarified in the step 201 that the engine speed N is equal to or higher than the engine speed N5, the process returns to the step 172. On the other hand, the engine speed N is lower than the engine speed N5 as a result of the check in the step 201, the flag F5 is set to be 1 in step 202, and the control signal E1 is supplied to the three-way solenoid valve 127 so that the intake air cutoff valve 121 is closed, in step 203, then the process returns to the step 172.

Further, when it is clarified in the step 181 that none of the flags F2, F4 and F6 is 1, it is checked whether the flag F3 is 1 or not in step 204. Then, if the flag F3 is 1, it is checked whether the intake air mass flow Q is smaller than the intake air mass flow Q1 or not, in step 205. If the intake air mass flow Q is smaller than the intake air mass flow Q1, it is further checked that the engine speed N is lower than the engine speed N1 or not, in step 206. If the engine speed N is lower than the engine speed N1 as a result of the check in the step 206, the flag F1 is set to be 1 in step 207, and the control signal E2 is supplied to the three-way solenoid valve 131 so that the intake air relief valve 123 is opened, in step 208, then the process returns to the step 172.

When it is clarified in the step 205 that the intake air mass flow Q is equal to or larger than the intake air mass flow Q1 or it is clarified in the step 206 that the engine speed N is equal to or higher than the engine speed N1, it is checked whether the intake air mass flow Q is larger then the intake air mass flow Q4 or not, in step 209. If the intake air mass flow Q is equal to or smaller than the intake air mass flow Q4, it is checked whether the engine speed N is higher than the engine speed N4 or not, in step 210.

If the engine speed N is equal to or lower than the engine speed N4 as a result of the check in the step 210, the process returns to the step 172. On the other hand, if it is clarified in the step 209 that the intake air mass flow Q is larger than the intake air mass flow Q4 or it is clarified in the step 210 that the engine speed N is higher than the engine speed N4, the flag F4 is set to be 1 in step 211, and the control signal E3 is supplied to the three-way solenoid valve 129 so that the exhaust cutoff valve 111 is opened, in step 212, then the process returns to the step 172.

When it is clarified in the step 204 that the flag F3 is 0, it is checked whether the intake air mass flow Q is smaller than the intake air mass flow Q3 or not, in step 213. If the intake air mass flow Q is smaller than the intake air mass flow Q3, it is further checked that the engine speed N is lower than the engine speed N3 or not, in step 214. If the engine speed N is lower than the engine speed N3 as a result of the check in the step 214, the flag F3 is set to be 1 in step 215, and the control signal E3 is supplied to the three-way solenoid valve 129 so that the exhaust cutoff valve 111 is closed, in step 216, then the process returns to the step 172.

When it is clarified in the step 213 that the intake air mass flow Q is equal to or larger than the intake air mass flow Q3 or it is clarified in the step 214 that the engine speed N is equal to or higher than the engine speed N3, it is checked whether the intake air mass flow Q is larger then the intake air mass flow Q6 or not, in step 217. If the intake air mass flow Q is equal to or smaller than the intake air mass flow Q6, it is checked whether the engine speed N is higher than the engine speed N6 or not, in step 218.

If the engine speed N is equal to or lower than the engine speed N6 as a result of the check in the step 218, the process returns to the step 172. On the other hand, if it is clarified in the step 217 that the intake air mass flow Q is larger than the intake air mass flow Q6 or it is clarified in the step 218 that the engine sped N is higher than the engine speed N6, the flag F6 is set to be 1 in step 219, and the control signal E1 is supplied to the three-way solenoid valve 127 so that the intake air cutoff valve 121 is opened, in step 220, then the process returns to the step 172.

In the embodiment shown in FIG. 6 also, it is possible to modify the operations of the exhaust cutoff valve 111 and the intake air relief valve 123 so that the intake air relief valve 123 is closed at the time point at which the exhaust cutoff valve 111 is opened on the occasion of the start of the supercharging operation of the secondary turbosupercharger 110, and further it is also possible to use a supercharger other than a turbosupercharger in place of the primary turbosupercharger 109.

What is claimed is:

1. An air supply control system for an internal combustion engine comprising:
   a plurality of superchargers including at least a first supercharger and a second supercharger which comprises a turbosupercharger having a turbine disposed in one of separated exhaust passages connected with the engine and a blower connected through a shaft with the turbine and disposed in one of separated intake passages connected with the engine,
   a selectively operated exhaust cutoff valve for opening and closing the separated exhaust passage in which the turbine of said second supercharger is disposed,
   a selectively operated intake air cutoff valve for opening and closing the separated intake passage in which the blower of said second supercharger is disposed,
   a selectively operated intake air relief valve for opening and closing a relief passage which is provided in the separated intake passage in which the blower of said second supercharger is disposed for detouring the blower of said second supercharger,
   engine operation detecting means for detecting operating conditions of the engine to produce a detection output,
   cutoff valve control means operative, in response to the detecting output from said engine operation detecting means, to close both said exhaust cutoff valve and said intake air cutoff valve so that said first supercharger works for supercharging the engine and said second supercharger is restrained from supercharging the engine when intake air mass flow fed to the engine is relatively small, and to open both said exhaust cutoff valve and said intake air cutoff valve so that both of said first and second superchargers work simultaneously for supercharging the engine when the intake air mass flow fed to the engine is relatively large, and
   relief valve control means operative, in response to the detection output from said engine operation detecting means, to close said intake air relief valve at a time point earlier than another time point at which said exhaust cutoff valve is fully opened.

2. An air supply control system according to claim 1, wherein said first supercharger comprises a turbosupercharger having a turbine disposed in another of the separated exhaust passages and a blower connected through a shaft with the turbine and disposed in another of the separated intake passages.

3. An air supply control system according to claim 1, wherein said cutoff valve control means and said relief valve control means are operative to detect, based on the detection output from said engine operation detecting means, one of predetermined operating areas provided on an operating characteristic chart of the engine in which an actual operating condition of the engine resides and to control respectively said exhaust cutoff valve and said intake air relief valve in accordance with the detected operating area.

4. An air supply control system according to claim 3, wherein said operating characteristic chart shows the operating areas on a coordinate plane defined by coordinate axes representing respectively engine speed and engine load.

5. An air supply control system according to claim 4, wherein said engine load defining the coordinate plane shown by the operating characteristic chart is embodied by the intake air mass flow fed to the engine.

6. An air supply control system according to claim 1, wherein said cutoff valve control means and said relief valve control means are operative to cause said intake air cutoff valve to open at a time point later than the time point at which said intake relief valve is closed.

7. An air supply control system according to claim 1, wherein said cutoff valve control means is operative to delayed the opening of said intake air cutoff valve compared with said exhaust cutoff valve.

8. An air supply control system according to claim 7, wherein said cutoff valve control means and said relief valve control means are operative to detect, based on the detection output from said engine operation detecting means, one of predetermined operating areas provided on an operating characteristic chart of the engine in which an actual operating condition of the engine resides and to control respectively said exhaust and intake air cutoff valves and said intake air relief valve in accordance with the detected operating area.

9. An air supply control system according to claim 1 further comprising exhaust bypass means for supplying the turbine of said second supercharger, before said exhaust cutoff valve is fully opened, with an exhaust gas flow less than that supplied to the turbine of said second supercharger when said exhaust cutoff valve is fully opened.

10. An air supply control system according to claim 9, wherein said exhaust bypass means comprises an exhaust bypass passage provided in the separated exhaust passage in which the turbine of said second supercharger is disposed for detouring exhaust gas, with said exhaust cutoff valve and an exhaust bypass valve provided in said exhaust bypass passage for opening and closing selectively said exhaust bypass passage.

11. An air supply control system according to claim 9, wherein said exhaust bypass means is operative to supply the turbine of said second supercharger with the exhaust gas flow before said intake air relief valve is closed.

12. An air supply control system according to claim 1, wherein said relief valve control means is operative to advance the time point at which the intake air relief valve is closed before said exhaust cutoff valve is fully opened when the detection output from said engine operation detecting means represents that the engine is accelerating at a rapid rate.

13. An air supply control system according to claim 12 further comprising exhaust bypass means for supplying the turbine of said second supercharger, before said exhaust cutoff valve is fully opened, with exhaust gas flow less than that supplied to the turbine of said second supercharger when said exhaust cutoff valve is fully opened.

14. An air supply control system according to claim 10, wherein said exhaust bypass valve is operative to be opened when an air pressure in at least another of the separated intake passages at a position downstream of the first supercharger has a pressure value higher than a predetermined pressure value.

15. An air supply control system for an internal combustion engine comprising:
   a plurality of superchargers including at least a first supercharger and a second supercharger which comprises a turbosupercharger having a turbine disposed in one of separated exhaust passages connected with the engine and a blower connected through a shaft with the turbine and disposed in one of separated intake passages connected with the engine;
a selectively operated exhaust cutoff valve for opening and closing the separated exhaust passage in which the turbine of said second supercharger is disposed;
a selectively operated intake air cutoff valve for opening and closing the separated intake passage in which the blower of said second supercharger is disposed;
a selectively operated intake air relief valve for opening and closing a relief passage which is provided in the separated intake passage in which the blower of said second supercharged is disposed for detouring the blower of said second supercharger;
engine operation detecting means for detecting operating conditions of the engine to produce a detection output;
cutoff valve control means operative, in response to the detection output from said engine operation detecting means, to close both said exhaust cutoff valve and said intake air cutoff valve so that said first supercharger works for supercharging the engine and said second supercharger is restrained from supercharging the engine when intake air mass flow fed to the engine is relatively small and to open both said exhaust cutoff valve and said intake air cutoff valve so that both of said first and second superchargers work simultaneously for supercharging the engine when the intake air mass flow fed to the engine is relatively large;
relief valve control means operative, in response to the detection output from said engine operation detecting means, to close said intake air relief valve at a time point earlier than another time point at which said exhaust cutoff valve is fully opened; and
an exhaust bypass means for supplying the turbine of said second supercharger, before said exhaust cutoff valve is fully opened, with an exhaust gas flow less than that supplied to the turbine of said second supercharger when said exhaust cutoff valve is fully opened.

* * * * *